United States Patent
Zheng et al.

(10) Patent No.: US 11,029,283 B2
(45) Date of Patent: Jun. 8, 2021

(54) PIPE DAMAGE ASSESSMENT SYSTEM AND METHOD

(71) Applicant: Schlumberger Technology Corporation, Sugar Land, TX (US)

(72) Inventors: Shunfeng Zheng, Katy, TX (US); Zhanke Liu, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/027,124

(22) PCT Filed: Oct. 3, 2014

(86) PCT No.: PCT/US2014/058983
§ 371 (c)(1),
(2) Date: Apr. 4, 2016

(87) PCT Pub. No.: WO2015/051225
PCT Pub. Date: Apr. 9, 2015

(65) Prior Publication Data
US 2016/0252481 A1  Sep. 1, 2016

Related U.S. Application Data

(60) Provisional application No. 61/886,483, filed on Oct. 3, 2013.

(51) Int. Cl.
*G01N 27/82* (2006.01)
*G01N 27/83* (2006.01)
(Continued)

(52) U.S. Cl.
CPC .............. *G01N 27/83* (2013.01); *F17D 5/06* (2013.01); *G01M 3/40* (2013.01); *G01M 5/0033* (2013.01);
(Continued)

(58) Field of Classification Search
CPC . G01M 5/0033; G01N 21/8806; G01N 27/82; G01N 27/902; G01N 27/9026; G01N 27/9033
(Continued)

(56) References Cited

U.S. PATENT DOCUMENTS 3,940,689 A  2/1976  Johnson, Jr.
4,636,727 A  1/1987  Kahil et al.
(Continued)

FOREIGN PATENT DOCUMENTS

EP       2725352 A1    4/2014
JP     H09-318586 A   12/1997
(Continued)

OTHER PUBLICATIONS

International Search Report issued in International Patent Application No. PCT/US2015/065202 dated Feb. 26, 2016; 14 pages.
(Continued)

*Primary Examiner* — Raul J Rios Russo
(74) *Attorney, Agent, or Firm* — Rodney Warfford

(57) ABSTRACT

A technique facilitates examination of a tubing string. A sensor is mounted to monitor a pipe for a defect or defects. The sensor outputs data on the defect to a data processing system which identifies the type and severity of the defect. The data processing system also may be used to track the defect to determine changes to the defect during, for example, subsequent uses of the pipe. Based on the evaluation of the defect, recommendations are provided with respect to future use or handling of the pipe.

23 Claims, 2 Drawing Sheets

(51) Int. Cl.
*F17D 5/06* (2006.01)
*G01M 3/40* (2006.01)
*G01M 5/00* (2006.01)
*G01N 21/88* (2006.01)
*G01N 27/9013* (2021.01)
*G01N 27/90* (2021.01)

(52) U.S. Cl.
CPC ......... *G01N 21/8806* (2013.01); *G01N 27/82* (2013.01); *G01N 27/902* (2013.01); *G01N 27/9006* (2013.01); *G01N 27/9026* (2013.01)

(58) Field of Classification Search
USPC ... 324/51, 55, 200, 216, 217, 219, 228, 234, 324/237, 238, 244, 260, 300, 323, 332
See application file for complete search history.

(56) References Cited

U.S. PATENT DOCUMENTS

| | | | |
|---|---|---|---|
| 4,675,604 A | 6/1987 | Moyer et al. | |
| 4,704,580 A | 11/1987 | Moake et al. | |
| 5,090,039 A | 2/1992 | Gard et al. | |
| 5,303,592 A | 4/1994 | Livingston | |
| 5,323,856 A | 6/1994 | Davis et al. | |
| 5,461,313 A | 10/1995 | Bohon et al. | |
| 5,581,037 A | 12/1996 | Kwun et al. | |
| 5,793,200 A | 8/1998 | Berrill | |
| 5,826,654 A | 10/1998 | Adnan et al. | |
| 5,914,596 A | 6/1999 | Weinbaum | |
| 6,023,986 A * | 2/2000 | Smith | G01C 7/06 324/220 |
| 6,205,869 B1 | 3/2001 | Schadt et al. | |
| 6,241,028 B1 | 6/2001 | Bijleveld et al. | |
| 6,316,937 B1 | 11/2001 | Edens | |
| 6,321,596 B1 | 11/2001 | Newman | |
| 6,404,189 B2 | 6/2002 | Kwun et al. | |
| 6,820,653 B1 * | 11/2004 | Schempf | B08B 9/043 138/97 |
| 6,967,478 B2 | 11/2005 | Wayman et al. | |
| 7,163,055 B2 | 1/2007 | Coon et al. | |
| 7,347,261 B2 | 3/2008 | Markel et al. | |
| 7,357,179 B2 | 4/2008 | Zheng et al. | |
| 7,414,395 B2 | 8/2008 | Gao et al. | |
| 7,571,054 B2 | 8/2009 | Newman | |
| 7,783,432 B2 | 8/2010 | Orth et al. | |
| 8,049,494 B2 | 11/2011 | Lepage et al. | |
| 8,086,425 B2 | 12/2011 | Papadimitriou et al. | |
| 8,428,910 B2 | 4/2013 | Papadimitriou et al. | |
| 8,542,127 B1 | 9/2013 | Goroshevskiy et al. | |
| 9,176,096 B2 | 11/2015 | Goroshevskiy et al. | |
| 9,322,805 B2 | 4/2016 | Koka et al. | |
| 9,581,567 B2 | 2/2017 | Goroshevskiy et al. | |
| 9,671,371 B2 | 6/2017 | Liu et al. | |
| 9,964,519 B2 | 5/2018 | Goroshevskiy et al. | |
| 10,247,657 B2 | 4/2019 | Allen et al. | |
| 10,288,583 B2 | 5/2019 | Chang et al. | |
| 10,317,331 B2 | 6/2019 | Guner et al. | |
| 10,330,641 B2 | 6/2019 | Goroshevskiy et al. | |
| 2001/0017541 A1 * | 8/2001 | Kwun | G01N 29/265 324/240 |
| 2001/0022514 A1 * | 9/2001 | Light | G01N 29/2412 324/240 |
| 2001/0029989 A1 * | 10/2001 | Paz | G01V 15/00 138/104 |
| 2003/0052670 A1 | 3/2003 | Miszewski | |
| 2003/0098697 A1 | 5/2003 | Tanaka | |
| 2003/0118230 A1 | 6/2003 | Song et al. | |
| 2003/0155415 A1 * | 8/2003 | Markham | G06Q 50/00 235/376 |
| 2003/0164053 A1 | 9/2003 | Ignagni | |
| 2004/0095137 A1 * | 5/2004 | Kwun | G01N 29/2412 324/240 |
| 2004/0103121 A1 * | 5/2004 | Johnson | G06Q 10/06 |
| 2004/0205727 A1 * | 10/2004 | Sit | G06F 11/3664 717/125 |
| 2004/0216512 A1 | 11/2004 | Kwun et al. | |
| 2005/0046591 A1 | 3/2005 | Pacault et al. | |
| 2005/0242169 A1 * | 11/2005 | Michal, III | G05B 19/128 235/375 |
| 2006/0055584 A1 | 3/2006 | Waite et al. | |
| 2006/0096753 A1 | 5/2006 | Zheng et al. | |
| 2006/0184714 A1 * | 8/2006 | Dang | G06F 8/65 711/100 |
| 2006/0202685 A1 * | 9/2006 | Barolak | E21B 47/082 324/221 |
| 2006/0202686 A1 * | 9/2006 | Barolak | E21B 47/082 324/232 |
| 2006/0247868 A1 | 11/2006 | Brandstrom | |
| 2006/0254373 A1 | 11/2006 | Boudreaux | |
| 2007/0150084 A1 * | 6/2007 | Grubb | G06Q 10/00 700/110 |
| 2007/0222436 A1 | 9/2007 | Gao et al. | |
| 2007/0222438 A1 | 9/2007 | Reeves | |
| 2008/0035334 A1 | 2/2008 | Newman | |
| 2008/0106260 A1 | 5/2008 | Rogers | |
| 2008/0228412 A1 | 9/2008 | Orth et al. | |
| 2009/0243604 A1 | 10/2009 | Dutta et al. | |
| 2010/0131209 A1 | 5/2010 | Pacelli | |
| 2010/0131450 A1 * | 5/2010 | Nguyen | G06N 5/022 706/54 |
| 2011/0191045 A1 | 8/2011 | Boenisch | |
| 2012/0130651 A1 * | 5/2012 | Papadimitriou | G01N 27/9046 702/35 |
| 2013/0057269 A1 | 3/2013 | Koka et al. | |
| 2013/0060487 A1 | 3/2013 | Papadimitriou et al. | |
| 2013/0124109 A1 * | 5/2013 | Denenberg | G01N 17/04 702/35 |
| 2014/0088889 A1 | 3/2014 | Duckworth | |
| 2014/0107947 A1 * | 4/2014 | Papadimitriou | G01N 19/00 702/34 |
| 2014/0200831 A1 | 7/2014 | Smith et al. | |
| 2014/0207390 A1 | 7/2014 | Zheng et al. | |
| 2014/0327443 A1 | 11/2014 | Liu et al. | |
| 2014/0368191 A1 | 12/2014 | Goroshevskiy et al. | |
| 2015/0061659 A1 * | 3/2015 | Freear | G01N 27/72 324/238 |
| 2015/0377012 A1 | 12/2015 | Liu et al. | |
| 2016/0231278 A1 | 8/2016 | Goroshevskiy et al. | |
| 2016/0231279 A1 | 8/2016 | Hoyt | |
| 2016/0231280 A1 | 8/2016 | Zwanenburg et al. | |
| 2016/0252422 A1 | 9/2016 | Howitt | |
| 2017/0030850 A1 | 2/2017 | Castaneda-Lopez et al. | |
| 2017/0122309 A1 * | 5/2017 | Kusumba | F04B 51/00 |
| 2017/0122909 A1 * | 5/2017 | Goroshevskiy | G01N 27/82 |
| 2017/0241953 A1 | 8/2017 | Kagawa | |
| 2017/0261469 A1 | 9/2017 | Chang et al. | |
| 2017/0322182 A1 | 11/2017 | Zheng et al. | |
| 2017/0350864 A1 | 12/2017 | Goroshevskiy et al. | |
| 2017/0372704 A1 * | 12/2017 | Papadimitriou | G01M 5/0033 |
| 2018/0106762 A1 | 4/2018 | Boenisch | |
| 2018/0149552 A1 | 5/2018 | Wayman et al. | |
| 2018/0188207 A1 * | 7/2018 | Freear | G01N 27/82 |
| 2018/0196005 A1 | 7/2018 | Fanini et al. | |
| 2018/0266992 A1 | 9/2018 | Liu et al. | |
| 2018/0321133 A1 | 11/2018 | Allen et al. | |
| 2018/0356365 A1 | 12/2018 | Liu et al. | |
| 2019/0056355 A1 | 2/2019 | Amineh et al. | |
| 2019/0072522 A1 | 3/2019 | Desjardins | |
| 2019/0145931 A1 | 5/2019 | Feng et al. | |
| 2019/0145932 A1 | 5/2019 | Feng et al. | |
| 2019/0145933 A1 | 5/2019 | Feng et al. | |
| 2020/0208769 A1 | 7/2020 | Du | |

FOREIGN PATENT DOCUMENTS

| | | |
|---|---|---|
| JP | H11-83842 A | 3/1999 |
| JP | 2744942 B2 | 5/2019 |
| RU | 2097649 C1 | 11/1997 |
| RU | 2102738 C1 | 1/1998 |
| RU | 2149254 C1 | 5/2000 |
| WO | 1998016842 A1 | 4/1998 |
| WO | 1999040724 A1 | 8/1999 |
| WO | 2003058545 A1 | 7/2003 |

(56) References Cited

FOREIGN PATENT DOCUMENTS

| WO | WO 2012103541 | * | 1/2012 | ............... F17D 5/02 |
|----|---------------|---|--------|---------------------------|
| WO | 2012103541 A2 | | 8/2012 | |
| WO | 2012174057 A1 | | 12/2012 | |
| WO | 2014018844 A1 | | 1/2014 | |
| WO | 2015051225 A1 | | 4/2015 | |
| WO | 2015187923 A1 | | 12/2015 | |
| WO | 2016094775 A1 | | 6/2016 | |
| WO | 2017100387 A1 | | 6/2017 | |

OTHER PUBLICATIONS

Christian et al., "Statistical Analysis of Coiled Tubing Fatigue Data", SPE 121457-MS, Presented at the SPE/ICoTA Coiled Tubing and Well Intervention Conference and Exhibition, The Woodlands, Texas, USA, Mar. 31-Apr. 1, 2009, 7 pages.

Newman, K. R., "Coiled Tubing Life Modeling," SPE 22820, SPE Annual Technical Conference and Exhibition, Dallas, Texas, Oct. 6-9, 1991, 7 pages.

Burgos, R., Mattos, R. F. and Bulloch, S., "Delivering Value for Tracking Coiled Tubing Failure Statistics," SPE 107098, SPE/ICoTA Coiled Tubing and Well Intervention Conference and Exhibition, Mar. 20-21, 2007, 8 pages.

Rosen, P. M. A., "Remote Coiled Tubing Operation Monitoring", SPE 46038, 1998 SPE/ICoTA Coiled Tubing Roundtable, Houston, Texas Apr. 15-16, 1998, 7 pages.

Stanley, R. K., "Results of a New Coiled Tubing Assessment Tool," SPE 141944, 2011 SPE/ICoTA Coiled Tubing and Well Intervention Conference and Exhibition, The Woodlands, Texas, Apr. 5-6, 2011, 8 pages.

Zheng, A., Liu, Z., Zwanenburg, M., Burgos, R., Scuadroni, N., Stayer, A., "State of the Art Portable Measurement and Defect Detection Technology for Coiled Tubing," SPE 163945, 2013 SPE/ICoTA Coiled Tubing and Well Intervention conference & Exhibition, the Woodlands, Texas, Mar. 26-27, 2013, 8 pages.

Z. Liu, G. Minerbo, and A. Zheng, "Steel coiled tubing defect evaluation using magnetic flux leakage signals", SPE 168260, Coiled Tubing & Well Intervention Conference & Exhibition (ICoTA), The Woodlands, TX, Mar. 25-26, 2014, 16 pages.

University of Tulsa, CTMRC 2011-2012 Annual Project Review, Sep. 28, 2012, 49 pages.

Padron, T, Luft. B., Kee, E., Tipton, S., "Fatigue Life of Coiled Tubing with External Mechanical Damage," SPE 107113, 2007 SPE/ICoTA Coiled Tubing and Well Intervention Conference and Exhibition, The Woodlands, Texas, Mar. 20-21, 2007, 16 pages.

Lynch, "Magnetic Flux Leakage Robotic Pipe Inspection: Internal and External Methods", Rice University, A Thesis Submitted in Partial Fulfillment of the Requirements for the Degree Master of Science, Houston, Texas, Dec. 2009, 57 pages.

Tipton, S. M., "Coiled Tubing Deformation Mechanics: Diametral Growth and Elongation", SPE 36336, ICoTA/SPE North American Coiled Tubing Roundtable, Feb. 26-28, 1996, 9 pages.

Tipton et al.., "Fatigue Integrity Analysis of Rotating Coiled Tubing", SPE 100068. 2006 SPE/ICoTA Coiled Tubing and Well Intervention Conference and Exhibition, the Woodlands, TX, USA, Apr. 4-5, 2006, 7 pages.

Stanley, R. K., "New Results from Electromagnetic and Ultrasound Inspection of Coiled Tubulars", SPE 121810, SPE/ICoTA Coiled Tubing and Well Intervention Conference and Exhibition, Mar. 31-Apr. 1, 2009, 8 pages.

International Search Report and Written Opinion issued in International Patent Appl. No. PCT/US2017/022620 dated Jun. 12, 2017; 12 pages.

International Search Report and Written Opinion issued in International Patent Appl. No. PCT/US2016/065495 dated Mar. 29, 2017; 16 pages.

Jiang, Q., Experimental Study of Interference Factors and Simulation on Oil-Gas Pipeline Magnetic Flux Leakage Density Signal, Proceedings of the 2007 IEEE International Conference on Mechatronics and Automation, Harbin, China, 2007, pp. 3652-3656.

Xu, L.Y., "Reliability and failure pressure prediction of various grades of pipeline steel in the presence of corrosion defects and pre-strain", International Journal of Pressure Vessels and Piping, 89, 2012, pp. 75-84.

* cited by examiner

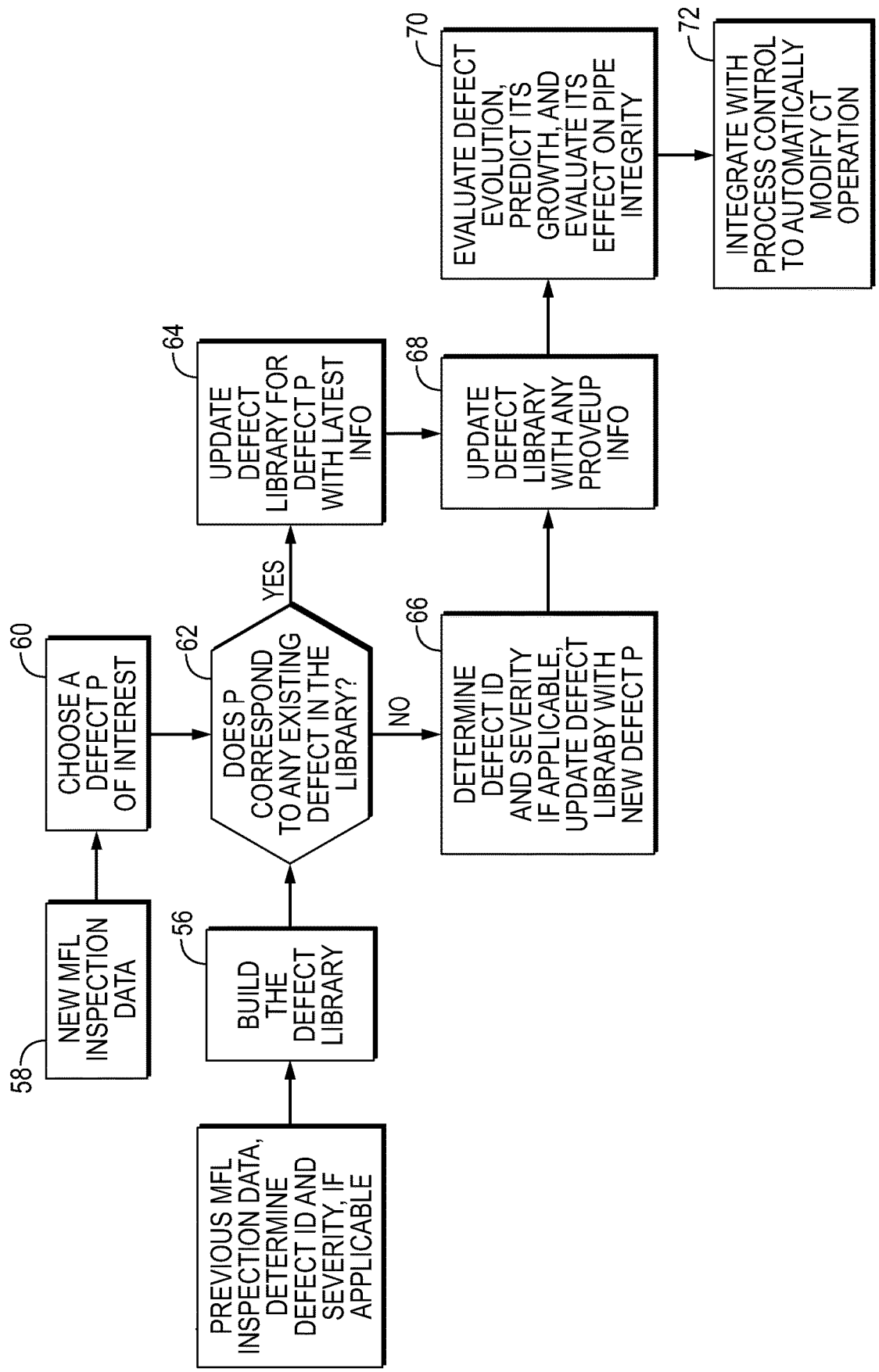

PIPE DAMAGE ASSESSMENT SYSTEM AND METHOD

CROSS-REFERENCE TO RELATED APPLICATION

The present document is based on and claims priority to U.S. Provisional Application Ser. No. 61/886,483, filed Oct. 3, 2013, incorporated herein by reference in its entirety.

BACKGROUND

Magnetic flux leakage (MFL) techniques have been used for pipe defect inspection in the oilfield services industry. An MFL based inspection device measures the flux leakage outside (around) the pipe. Wherever there is a defect, such as a material discontinuity or mechanical damage, the inspection device registers a change of the leakage signal. However, the signal output by the MFL inspection device provides limited information regarding merely the presence of a magnetic anomaly in the underlying pipe. Whether that anomaly is a physical mechanical damage, corrosion damage, material discontinuity, or another type of anomaly often is unclear to the inspector. Furthermore, the severity of such anomaly may be even more difficult to evaluate.

SUMMARY

In general, the present disclosure provides a system and method for examining a tubing string. A sensor is mounted to monitor a pipe for a defect or defects. The sensor outputs data on the defect to a data processing system which identifies the type and severity of the defect. The data processing system also may be used to track the defect to determine changes to the defect during, for example, subsequent uses of the pipe. Based on the evaluation of the defect, recommendations are provided with respect to future use or handling of the pipe.

BRIEF DESCRIPTION OF THE DRAWINGS

Certain embodiments will hereafter be described with reference to the accompanying drawings, wherein like reference numerals denote like elements. It should be understood, however, that the accompanying figures illustrate various implementations described herein and are not meant to limit the scope of various technologies described herein, and:

FIG. 4 is a flowchart illustrating an example of a procedure for defect tracking and evaluation with respect to pipe, according to an embodiment of the disclosure.

DETAILED DESCRIPTION

Figure 1:
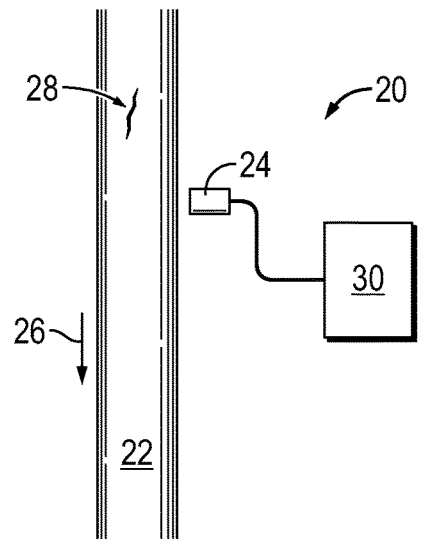
FIG. 1 is a schematic illustration of an example of a pipe damage assessment system for evaluating pipe, e.g. jointed pipe or coiled tubing, according to an embodiment of the disclosure.

In the following description, numerous details are set forth to provide an understanding of some illustrative embodiments of the present disclosure. However, it will be understood by those of ordinary skill in the art that the system and/or methodology may be practiced without these details and that numerous variations or modifications from the described embodiments may be possible.

The disclosure herein generally relates to a methodology and system for evaluating pipe by employing a sensor system and a processing system to help users identify specific kinds of defects associated with changes in sensor signals. The methodology and system also may be employed to evaluate the severity of the defects as they relate to the integrity of the pipe. This evaluation helps determine the remaining strength and service life of the pipe. The methodology and system can be used with a variety of pipes and other equipment employed in, for example, oilfield surface equipment and/or downhole assemblies.

A methodology is provided to identify, track, and evaluate the severity of pipe defects using inspection signals acquired through a pipe inspection system. In some applications, a pipe damage assessment system and method according to embodiments described herein comprise a nondestructive testing (NDT) based pipe management system. By way of example, the NDT system may comprise a magnetic flux leakage (MFL) sensor used to detect and monitor defects. The NDT system and methodology may comprise various components including, for example, data acquisition and analysis software, an expert knowledge database, a related service quality policy system, and/or other appropriate systems and components.

According to an embodiment, a defect identification and severity evaluation process may comprise one of or a plurality of process components. Examples of those components comprise: building a standard defect database with details of MFL signals (or other suitable signals), determining defect geometry and severity thresholds; identifying the nature of a new defect by finding the benchmark defect in a defect database that has a predetermined correlation with the new defect; and determining the severity of the new defect by comparing the measured signals, e.g. MFL signals, against the defect threshold of the standard defect in the defect database.

The embodiment also may comprise a defect tracking and defect growth prediction process which also may comprise one or more of a plurality of process components. Examples of those components comprise: establishing a string defect library from an inspection job, wherein each defect in the library contains the measured signals, e.g. MFL signals, the location of the defect, the defect's underlying material features, and/or other appropriate information; capturing a list of defects from a new inspection job, and for any defect identified in the new inspection data, identifying its corresponding defect in the previous defect library; evaluating the severity of the defect by using the defect identification and severity evaluation process discussed above; and evaluating the evolution of the defect from a series of inspections to predict its severity for the future use of the underlying pipe.

It should be understood that the first time a defect appears may be very useful. If some jobs are missing MFL inspections, it may be feasible to provide statistical estimations of the first appearance of certain defects. In addition to tracking defects detected by the NDT system, e.g. MFL system, the number of bending cycles and the pumping pressure may be tracked during the defect evolution from the first appearance of the defect. Such additional information relating to bending cycles and pressures can be useful in further enhancing the usefulness of the system and method of the embodiments described herein. According to an operational example, the system and methodology may be utilized to predict the growth of a defect or defects from previous defect evolution.

Embodiments of the pipe damage interpretation system may comprise two basic processes, namely: to identify and evaluate a defect, and to track and predict the growth of a defect over the useful lifespan of a pipe. In general, the two processes comprise a defect identification and severity evaluation process and/or method; and a defect tracking and severity evaluation process. Each of these processes is discussed in greater detail below.

Referring generally to FIG. 1, an example of a pipe damage assessment system 20 for evaluating pipe 22, e.g. jointed pipe or coiled tubing, is illustrated. It should be noted that the embodiments described herein may be employed in well or non-well related applications. Additionally, the pipe damage assessment system 20 may comprise a variety of pipe support systems, pipe delivery systems, sensor arrangements, local and/or remote processing systems, data evaluation algorithms, models, and/or other software programs, as well as other components arranged in various configurations depending on the parameters of a pipe damage assessment application.

In FIG. 1, an embodiment of the pipe evaluation system 20 is illustrated as moving pipe 22 past an appropriate sensor or sensors 24, such as MFL sensors which monitor magnetic flux leakage. The relative movement of pipe 22 is indicated by arrow 26, however some embodiments may be constructed to move the sensor or sensors 24 along a stationary pipe 22. Additionally, both the pipe 22 and the sensor(s) 24 may be moved relative to each other.

Each sensor 24 is positioned to monitor for the presence of a defect 28 and to output sensor data to a data processing system 30. The signals provided by sensor 24 change upon detection of the defect or defects 28, and the changes in that sensor data can be processed via data processing system 30 to determine, for example, defect geometry, defect severity, the nature of an unknown defect, the location of the defect, the underlying material features of the defect, and/or other or additional data related to the detected defect 28. If the sensor or sensors 24 comprise MFL sensors, for example, the magnetic flux leakage changes according to such characteristics associated with the defect. These changes in the magnetic flux leakage are relayed from the sensor 24 to the data processing system 30 for evaluation, as described in greater detail below.

In the example illustrated, sensor 24 may comprise an MFL sensor and/or other types of sensors positioned to detect a desired defect or defects related to pipe 22. In some embodiments sensor 24 may comprise a single sensor but sensor 24 also may comprise a plurality of sensors or sensor elements. The sensor or sensors 24 may be positioned along pipe 22 at different locations selected to detect and monitor various types of defects. In a specific embodiment, sensor 24 comprises a plurality of magnetic flux leakage sensing elements positioned to detect along the circumference of pipe 22 as pipe 22 and sensor(s) 24 moved relative to each other. By way of example, pipe 22 may be in the form of coiled tubing which moves relative to the sensor; or pipe 22 may comprise individual pipe joints which are moved relative to the sensor.

Data obtained by the sensor or sensors 24 is transmitted to processing system 30. The processing system 30 may be located in whole or in part at a well site, at a well testing facility, and/or at a remote location. After processing data from each sensor 24, the processing system 30 may be used to display or otherwise output results of the processing related to the detection and evaluation of defects 28. The raw and/or processed data may be sent to other systems and other locations for further processing, analysis, and/or control operations.

Figure 2:
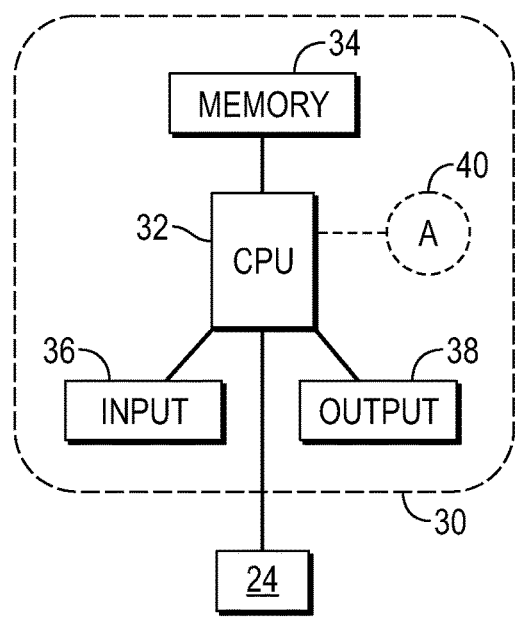
FIG. 2 is a schematic illustration of a processor-based system for evaluating sensor data obtained while evaluating pipe, according to an embodiment of the disclosure.

Referring generally to FIG. 2, an example of processing system 30 is illustrated. In this example, processing system 30 is in the form of a computer-based system having a processor 32, such as a central processing unit (CPU). The processor 32 is coupled with sensor or sensors 24 and is operatively employed to intake sensor data related to defects 28 and then to process the data, e.g. run appropriate models and/or algorithms. The processor 32 also may be operatively coupled with a memory 34, an input device 36, and an output device 38. In some applications, processor 32 is used to run selected algorithms/models via a software module 40. For example, the software module 40 may comprise pattern matching software which compares image data and/or other data obtained from each sensor 24 to a predetermined defect database. By way of example, the predetermined defect database may be stored in memory 34 and/or in another storage area accessible by CPU 32. Software module 40 may comprise many types of models, algorithms, and programs selected according to the types of sensors 24, environmental considerations, types of defects anticipated, and/or other parameters.

By way of example, input device 36 may comprise a variety of devices, such as a keyboard, mouse, voice recognition unit, touchscreen, other input devices, or combinations of such devices. Output device 38 may comprise a visual and/or audio output device, such as a computer display, monitor, or other display medium having a graphical user interface. The processing may be done on a single device or multiple devices on location, away from the pipe testing location, or with some devices located on location and other devices located remotely. Once the desired algorithm, modeling, software, and/or other programming of software module 40 is stored in, for example, memory 34, processing system 30 may be operated to detect and evaluate defects 28. The data processing system 30 and software module 40 work in cooperation to perform, for example, the defect identification and severity evaluation process as well as the defect tracking and severity evaluation process discussed in greater detail below. In some applications, the detection and evaluation of defects may be performed in real time.

Figure 3:
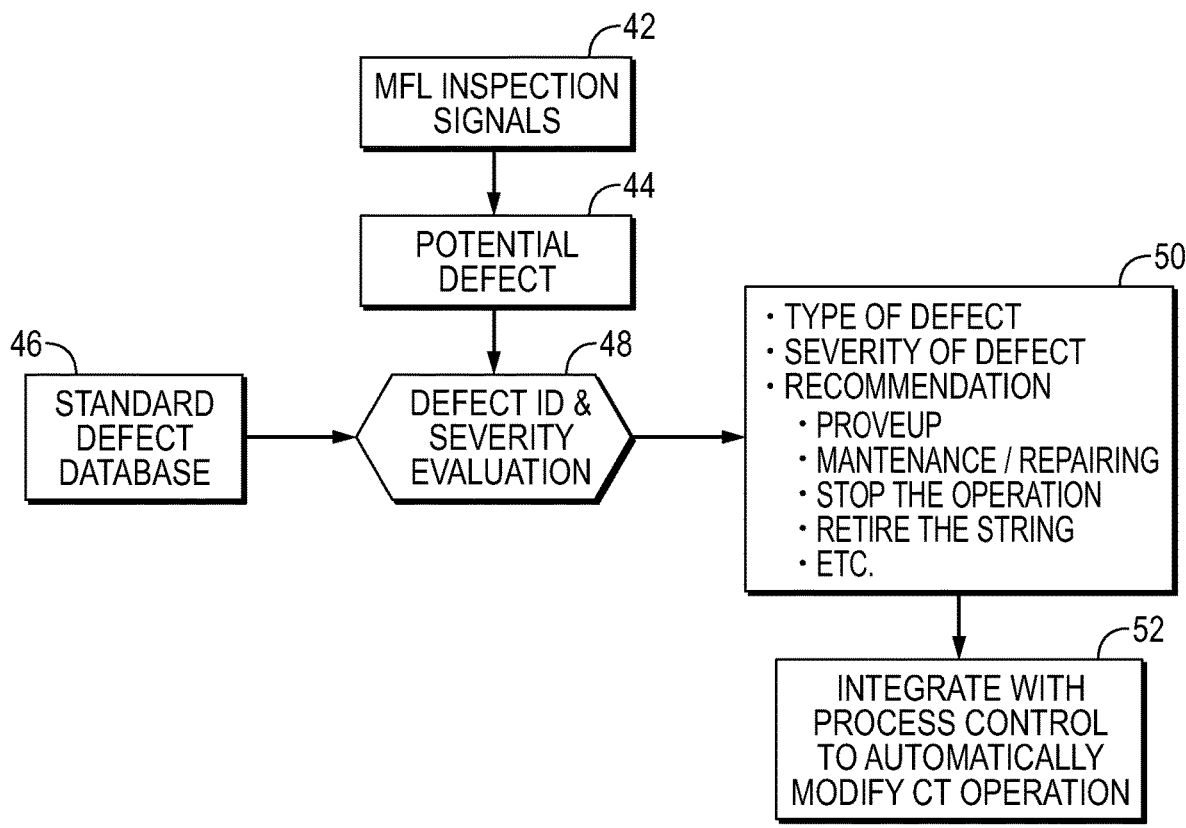
FIG. 3 is a flowchart illustrating an example of a procedure for defect identification and severity evaluation with respect to pipe, according to an embodiment of the disclosure.

Referring generally to FIG. 3, an example of a process for defect identification and severity evaluation is illustrated. In this example, the sensor or sensors 24 comprise MFL sensors for detecting changes in magnetic flux leakage, but other types of sensors 24 may be employed. The MFL sensors output inspection signals for evaluation by data processing system 30, as represented by block 42 of the flowchart illustrated in FIG. 3. The defect identification and severity evaluation process may comprise a software method and/or process embodied in, for example, software module 40 which detects the existence of a potential defect, as represented by block 44. Existence of the potential defect may be based on a factor or a plurality of factors, including tubing geometry measurements, MFL signal thresholds, and/or other factors.

The defect identification and evaluation methodology also may utilize a standard defect database, as represented by block 46. The standard defect database may be stored in memory 34 or in another suitable storage location accessible by CPU 32 of data processing system 30. The standard defect database may be used to store data representative of defects that occur during actual operations employing pipe 22 or other pipes of similar property. Examples of the stored defects include mechanical dents, gouges, corrosion pits, and/or other types of defects.

Such defects may be either internal or external defects. Within the standard defect database, each type of defect may have a data entry or entries for the defect according to its position with respect to different orientations, such as axial (longitudinal) orientations, transverse (circumferential) orientations, inclined (between axial and transverse) orientations, and/or other orientations. Each type of defect also may contain the type of mechanism that causes the defect to occur, such as dent, gouge, abrasion, corrosion, manufacturing process mechanism, or other mechanisms. Additionally, each type of defect may have a data entry or entries for various defect dimensions, such as depth, width, length, and/or other dimensions. Each type of defect may further contain a defect severity threshold or thresholds that conform to a service quality policy. In many applications, the defect database is not static but can be enriched and enhanced on a dynamic basis as new data becomes available regarding defects. Low-quality data, outdated defect entries, and/or other undesirable data may sometimes be removed from the standard defect database based on, for example, new data obtained from testing and/or field use of the pipe 22 or other similar pipes.

Each entry in the standard defect database may contain a number of materials and defect attributes. Examples of data representing such attributes include a digital description of the defect, such as a picture and/or image of the defect. The picture/image may comprise a camera picture, a laser scan picture, an x-ray picture, a dye penetration picture, a magnetic particle imaging picture, a metallurgy analysis picture, and/or other suitable pictures/images. Additional examples of data representing such attributes comprise data on the common dimensions of the defect, the MFL signals for the corresponding physical defect (which may include signals for the same defect at its different stages), an inspection threshold of the corresponding defect type, and/or other operational safety attributes.

In the embodiment illustrated, the defect identification and severity evaluation process further utilizes a defect identification and severity evaluation algorithm, as represented by block 48. The defect identification algorithm may be embodied in software module 40 and is employed via processor/CPU 32 to compare the potential defect signal based on data from the sensor 24, e.g. MFL inspection device, against the standard defect database 46. By calculating the correlation of this potential defect signal with the entries in the standard defect database 46, the algorithm determines the closest match between a corresponding defect in the database 46 and the potential defect 28 detected via sensor 24, as represented by block 50.

The software module 40, e.g. algorithm, also is used to perform a defect severity evaluation on the potential defect signal by making use of, for example, the results of a signature match with the standard corresponding defect selected from the standard defect database (see block 50). Once the algorithm identifies that defect 28 is of the same type as a stored defect in the standard defect database 46, the algorithm evaluates the severity of the defect 28 by comparing the level of MFL in the defect 28 against the severity threshold in the stored defect. The severity threshold may be used to determine fit-for-service with respect to the corresponding pipe 22 and its intended operation envelope, service guidelines, or other suitable criteria.

In some applications, the software module/algorithm 40 may be selected or programmed to perform a more elaborate numerical analysis. The more elaborate numerical analysis may take into account the MFL signal related to the potential defect 28 and the geometrical information from a standard defect stored in the standard defect database 46 to determine the actual dimensions for the defect 28. This knowledge facilitates evaluation of the effect of the defect 28 on the mechanical integrity of the pipe 22. In some applications, the nature of an unknown defect 28 may be determined by finding a benchmark defect in the standard defect database.

Results of the severity evaluation may comprise information on defect size (e.g. length, width, depth), defect topology (e.g. a single defect or an array of defects), detrimental effects on remaining life of the pipe (e.g. remaining coiled tubing fatigue life), detrimental effects on the safe operation envelope of the pipe (e.g. safe operation envelope of coiled tubing), and/or other results. In some applications, the evaluation of defect severity may be performed in conjunction with other types of software, such as existing coiled tubing operation and job design software.

In various applications, the defect severity evaluation also may be used as a quality control tool. For example, the defect database 46 may comprise manufacturing features such as bias weld, seam weld, grind repair, and/or other manufacturing features. For quality control purposes, the database 46 may comprise both good and bad manufacturing features. Using the defect identification algorithm/software module 40, an operator may distinguish the bad features from the good features. This enables further actions to be taken to overcome the bad features or to reject the pipe 22 under a quality control regimen.

Additionally, the defect identification algorithm/software module 40 may be utilized in real time during an operation utilizing the pipe 22, e.g. during a coiled tubing operation in a wellbore. In some applications, the software module 40 may be integrated into additional real time data acquisition and analysis software and/or into post-operation analysis software. The real time and/or post-operation modes may be executed on-site and/or at a remotely connected location via satellite or the Internet. As discussed above, the data processing system 30 may be located on-site, remotely, or with part of the system located on-site and part of the system located remotely.

As further illustrated in block 50 of FIG. 3, the defect identification and severity evaluation process also may comprise outputting defect identification and severity evaluation results via, for example, output device 38. The results may be presented to an operator and/or other user and may provide an indication of the type of defect and/or the severity of the defect. The results also may provide recommendations with respect to actions that may be taken in light of the type and severity of the defect. By way of example, the recommendations may comprise performing further prove-up (employing visual or manual inspection of the identified defect 28), performing maintenance, e.g. grinding out the defect, stopping the operation, retiring the string or joint of pipe 22, and/or other actions (see block 50). The results also may give an indication as to the in-situ integrity of the pipe 22, whether the pipe 22 is fit for a given service, and/or whether the pipe 22 meets other predetermined criteria.

The results and the recommendations based on those results may be integrated with process control to automatically modify an operation related to pipe 22, as represented by block 52. In a coiled tubing operation related to a well, for example, the recommendations may be used by the coiled tubing process control system to automatically modify the coiled tubing operation. The coiled tubing process control system or other process control system may be part of or may work in cooperation with data processing system 30. In various applications, the modification of the coiled tubing operation or other pipe related operation may be made in real time during the operation.

Referring generally to FIG. 4, an example of a process for defect tracking and severity evaluation is illustrated. This process may be employed to track the defect and to help predict defect growth. In this example, the sensor or sensors 24 comprise MFL sensors, but other types of sensors 24 may be employed. The process may comprise at least one of a plurality of components including: using the first available MFL inspection data for a pipe 22, e.g. tubing string; locating each defect 28 in the pipe 22; and, if applicable, identifying the corresponding signature of each defect 28 from the defect entries stored in the standard defect database, as discussed above, and as represented by block 54.

Additionally, the process for defect tracking and severity evaluation may comprise building a defect library for the pipe 22, e.g. tubing string, as represented by block 56. Each of the defects stored in the defect library may comprise an individual attribute or a plurality of attributes including, for example, MFL signal, location of defect 28 on the pipe 22, corresponding tubing/pipe wall thickness, corresponding standard signature, pipe dimensions, whether the defect has been proved up by visual inspection, inspector validation, and/or other suitable attributes.

In this example, the process may further comprise taking and/or choosing a given subsequent inspection data, as represented by block 58. The process also may comprise choosing a defect 28 of interest from the subsequent inspection data, as represented by block 60, while noting/storing the corresponding location of the defect 28 in the pipe 22. The process may further comprise determining whether the same defect exists in previous inspection data by finding whether there is a match between the defect 28 and a stored defect in the defect library, as represented by block 62. Determining whether a match exists may involve considering various similarities, such as sensor signal similarity, depth similarity, wall thickness similarity, and/or other similarities.

If a match exists (see block 62), the library may be updated automatically or by operator choice with the latest data for the defect 28, as represented by block 64. This type of historical data regarding defects 28 may be kept and stored in the defect library for future use by data processing system 30. If there is no match (see block 62), the defect tracking and severity evaluation process may comprise identifying a corresponding signature of the defect 28 from the standard defect database, if applicable, and updating the defect library with the addition of the new defect data on defect 28, as represented by block 66. In some applications, the library may be updated by capturing a list of defects from a new pipe inspection job or other relevant pipe inspection jobs.

If prove-up is performed on the defect 28, the defect tracking and severity evaluation process may include updating the data and/or information in the defect library as well as updating the inspector's validation attributes, if applicable, as represented by block 68. Additionally, if repair activities are performed, e.g. grinding out the defect, the quality of such repair activities may be evaluated using the standard defect database. The quality of the repair can be checked by matching the MFL signature of the repaired defect with, for example, a bad repair signature in the standard defect database. If a match occurs with respect to the bad repair signature, further repair work should be performed and the defect should be reworked until suitable quality criteria are met.

The process may further comprise conducting data analysis on the history of the defect 28, predicting the future evolution of the defect 28, and/or predicting the effect of the defect 28 on pipe integrity, as represented by block 70. It should be noted that a useful part of the process may be determining the first occurrence of a given defect 28. If the pipe inspection operations are missing MFL inspections, it may be feasible to provide statistical estimations of the first appearance of certain defects based on job history and defect tracking results. In an embodiment, the number of bending cycles and the pumping pressures during defect evolution occurring since the first appearance of the defect 28 may be tracked in combination with tracking defects detected by the NDT system, e.g. MFL system. The data may be used to help predict defect growth.

The defect tracking and severity evaluation process also may comprise providing feedback information to a process control to enable automatic modification of operational parameters, as indicated by block 72. For example, the process may provide feedback information to a coiled tubing process control so as to automatically modify operational parameters of the coiled tubing operation. Such feedback may help mitigate/reduce the impact on the remaining coiled tubing fatigue life and/or coiled tubing strength due to the defects.

The system and methodology described herein may be employed in non-well related applications which utilize evaluation of coiled tubing, jointed pipe, and/or other tubing strings. Additionally, processes may employ a variety of sensors, data processing systems, and/or software modules for evaluating sensor data and/or making recommendations. The system may be automated to implement automatic changes to a tubing string operation based on defect data detected and evaluated. In some applications, the operational changes can be made in real time. Additionally, various types of storage databases/libraries may be constructed to accumulate many types of defect data. Also, elements of the overall processes described herein may be performed at a variety of times and in various orders during implementation of the processes.

Although a few embodiments of the system and methodology have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method for examining a tubing string, comprising:
   moving a pipe of the tubing string relative to a sensor;
   using the sensor to monitor the pipe for a defect;
   outputting data on the defect to a data processing system;
   identifying the defect by finding a matching benchmark defect in a defect database;
   tracking the defect to determine changes to the defect over time based on the data output by the sensor; and
   automatically changing an operation using the pipe based on identifying and tracking of the defect.

2. The method as recited in claim 1, wherein using comprises using the sensor in a nondestructive testing (NDT) system.

3. The method as recited in claim 1, wherein using comprises using the sensor to monitor magnetic flux leakage.

4. The method as recited in claim 1, further comprising identifying the type and severity of the defect based on the data output by the sensor.

5. The method as recited in claim 4, wherein identifying comprises determining a geometry of the defect.

6. The method as recited in claim 4, wherein identifying comprises determining whether the defect crosses a severity threshold.

7. The method as recited in claim 4, wherein identifying comprises identifying the nature of an unknown defect.

8. The method as recited in claim 1, wherein tracking comprises capturing a list of defects from a pipe inspection job in a defect library.

9. The method as recited in claim 8, further comprising matching a new defect from the list of defects with stored defect data in a defect library.

10. The method as recited in claim 1, further comprising tracking the number of bending cycles experienced by the pipe.

11. The method as recited in claim 1, further comprising tracking the pumping pressures experienced by the pipe.

12. The method as recited in claim 4, wherein identifying comprises identifying the type and severity of the defect in real time during an operation using the pipe.

13. The method as recited in claim 1, wherein changing comprises automatically changing portions of a coiled tubing operation.

14. The method as recited in claim 1, further comprising predicting the growth of the defect.

15. A method, comprising:
   moving a pipe relative to a sensor, the sensor positioned along a circumference of the pipe;
   using the sensor to monitor the pipe for the presence of defects;
   outputting data from the sensor to a data processing system having a processor;
   storing a standard defect database in a memory accessible by the processor;
   providing the standard defect database with defect data entries which categorize defects by at least one of the following: orientation, dimension, defect type, defect severity threshold, and the mechanism causing the defect;
   updating the standard defect database as new defect data becomes available;
   processing the data from the sensor regarding defects via the data processing system according to an algorithm to match the defects against defect entries in the standard defect database;
   determining the type and severity of the defect; and
   using the data processing system to automatically take an action with respect to future use of the pipe based on the match of defects and the determination of the type and severity of the defects.

16. The method as recited in claim 15, wherein using comprises using a magnetic flux leakage sensor.

17. The method as recited in claim 15, wherein determining the type and severity comprises determining a size of the defect.

18. The method as recited in claim 15, wherein determining the type and severity comprises determining whether the pipe remains within a safe operational envelope.

19. The method as recited in claim 15, further comprising tracking changes to the defects over the life of the pipe.

20. The method as recited in claim 15, wherein the pipe comprises coiled tubing.

21. A system for defect evaluation, comprising:
   a sensor positioned along a circumference of a moving pipe to monitor for defects in the pipe; and
   a data processing system coupled to the sensor, the data processing system comprising a memory in which a defect database is stored, the data processing system further comprising a processor which processes data received from the sensor according to an algorithm that matches defects detected in the pipe with stored defect entries in the defect database to identify the defects, the data processing system further being programmed to:
      track the identified defects based on the data received from the sensor to determine changes in the identified defects over time; and
      automatically adjust an operation using the pipe based on the changes in the identified defects over time.

22. The system as recited in claim 21, wherein the sensor is a magnetic flux leakage sensor.

23. The system as recited in claim 21, wherein the pipe comprises coiled tubing.

* * * * *